(12) United States Patent
Paterson et al.

(10) Patent No.: US 7,809,682 B2
(45) Date of Patent: Oct. 5, 2010

(54) DATA SYNCHRONIZATION BETWEEN MULTIPLE DEVICES

(75) Inventors: Toby Paterson, Paris (FR); Jérôme Lebel, Paris (FR)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 10/852,926

(22) Filed: May 24, 2004

(65) Prior Publication Data

US 2006/0041603 A1 Feb. 23, 2006

(51) Int. Cl.
*G06F 7/00* (2006.01)
*G06F 17/00* (2006.01)

(52) U.S. Cl. .................. 707/625; 707/612; 707/621; 707/624

(58) Field of Classification Search ............... 707/200, 707/612, 621, 624, 625
See application file for complete search history.

(56) References Cited

U.S. PATENT DOCUMENTS

| | | | |
|---|---|---|---|
| 4,937,743 A | 6/1990 | Rassman et al. | |
| 5,129,057 A | 7/1992 | Strope et al. | |
| 5,247,438 A | 9/1993 | Subas et al. | |
| 5,323,314 A | 6/1994 | Baber et al. | |
| 5,423,023 A * | 6/1995 | Batch et al. | 717/117 |
| 5,457,476 A | 10/1995 | Jenson | |
| 5,500,938 A | 3/1996 | Cahill et al. | |
| 5,528,745 A | 6/1996 | King et al. | |
| 5,621,458 A | 4/1997 | Mann et al. | |
| 5,621,876 A | 4/1997 | Odam et al. | |
| 5,634,100 A | 5/1997 | Capps | |
| 5,659,768 A | 8/1997 | Forbes et al. | |
| 5,664,063 A | 9/1997 | Johnson et al. | |
| 5,761,646 A | 6/1998 | Frid-Nielsen et al. | |
| 5,805,163 A | 9/1998 | Bagnas | |
| 5,838,889 A | 11/1998 | Booker | |

(Continued)

FOREIGN PATENT DOCUMENTS

EP 0276427 A2 8/1988

(Continued)

OTHER PUBLICATIONS

B. Mahoney, G. Babics, A. Taler: "Guide to Internet Calendaring", Network Working Group, Request for Comments: 3283, Jun. 2002.

(Continued)

*Primary Examiner*—John R. Cottingham
*Assistant Examiner*—Mariela D Reyes
(74) *Attorney, Agent, or Firm*—Blakely, Sokoloff, Taylor & Zafman LLP

(57) ABSTRACT

The present invention comprises a method of data synchronization between multiple devices by, in one embodiment, classifying one device to be a primary device and other devices to be subsidiary devices. Synchronization is performed, in one embodiment, by updating the primary device with data from the subsidiary devices, and then updating each subsidiary device using data from the updated primary device. The exemplary data synchronization according to the present invention can accommodate for absent devices, avoid redundant synchronization operations, accommodate for data truncation or translation and preserve synchronization of relationships. The devices may be any one of computers, handheld devices (e.g. a Palm device), personal digital assistants, music devices, and mobile telephones. The data to be synchronized may include any data, and even applications can be synchronized.

21 Claims, 5 Drawing Sheets

U.S. PATENT DOCUMENTS

| | | | |
|---|---|---|---|
| 5,842,009 A | 11/1998 | Borovoy et al. | |
| 5,855,006 A | 12/1998 | Huemoeller et al. | |
| 5,860,067 A | 1/1999 | Onda et al. | |
| 5,895,451 A | 4/1999 | Yamade et al. | |
| 5,899,979 A | 5/1999 | Miller et al. | |
| 5,960,406 A | 9/1999 | Rasansky et al. | |
| 6,039,355 A | 3/2000 | Durand | |
| 6,064,975 A | 5/2000 | Moon et al. | |
| 6,085,166 A | 7/2000 | Beckhardt et al. | |
| 6,101,480 A | 8/2000 | Conmy et al. | |
| 6,167,379 A | 12/2000 | Dean et al. | |
| 6,222,549 B1 | 4/2001 | Hoddie | |
| 6,243,325 B1 | 6/2001 | Tomono | |
| 6,278,456 B1 | 8/2001 | Wang et al. | |
| 6,369,840 B1 | 4/2002 | Barnett et al. | |
| 6,380,959 B1 | 4/2002 | Wang et al. | |
| 6,397,075 B1 | 5/2002 | Sastrodjojo et al. | |
| 6,421,685 B1 | 7/2002 | Nishikawa | |
| 6,430,576 B1 | 8/2002 | Gates et al. | |
| 6,456,614 B1 | 9/2002 | Guan et al. | |
| 6,466,236 B1 | 10/2002 | Pivowar et al. | |
| 6,604,079 B1 | 8/2003 | Ruvolo et al. | |
| 6,728,530 B1 | 4/2004 | Heinonen et al. | |
| 6,738,789 B2 | 5/2004 | Multer et al. | |
| 6,785,868 B1 | 8/2004 | Raff | |
| 6,868,426 B1 | 3/2005 | Mankoff | |
| 6,889,333 B2 | 5/2005 | Lawrence et al. | |
| 6,910,052 B2 | 6/2005 | Gates et al. | |
| 7,006,242 B2* | 2/2006 | Smith et al. | 358/1.15 |
| 7,006,484 B2 | 2/2006 | Hayama et al. | |
| 7,007,041 B2 | 2/2006 | Multer et al. | |
| 7,024,428 B1 | 4/2006 | Huang et al. | |
| 7,039,596 B1 | 5/2006 | Lu | |
| 7,047,011 B1 | 5/2006 | Wikman | |
| 7,143,117 B2 | 11/2006 | Wolfgang et al. | |
| 7,213,039 B2 | 5/2007 | Ramanujam et al. | |
| 7,280,996 B2 | 10/2007 | Hayakawa et al. | |
| 7,584,468 B2 | 9/2009 | Gates et al. | |
| 2001/0002822 A1 | 6/2001 | Watters et al. | |
| 2001/0014890 A1 | 8/2001 | Liu et al. | |
| 2001/0044805 A1 | 11/2001 | Multer et al. | |
| 2001/0049617 A1 | 12/2001 | Berenson et al. | |
| 2002/0003787 A1 | 1/2002 | Hayama et al. | |
| 2002/0010807 A1 | 1/2002 | Multer et al. | |
| 2002/0131565 A1 | 9/2002 | Scheuring et al. | |
| 2002/0184321 A1 | 12/2002 | Fishman et al. | |
| 2002/0191035 A1 | 12/2002 | Selent | |
| 2002/0196280 A1 | 12/2002 | Bassett et al. | |
| 2003/0045301 A1 | 3/2003 | Wollrab | |
| 2003/0050986 A1 | 3/2003 | Matthews et al. | |
| 2003/0065677 A1 | 4/2003 | Culp et al. | |
| 2003/0065742 A1 | 4/2003 | Culp et al. | |
| 2003/0130984 A1* | 7/2003 | Quinlan et al. | 707/1 |
| 2004/0023634 A1 | 2/2004 | Jeong et al. | |
| 2004/0039779 A1 | 2/2004 | Amstrong et al. | |
| 2004/0054763 A1* | 3/2004 | Teh et al. | 709/221 |
| 2004/0073615 A1 | 4/2004 | Darling | |
| 2004/0125142 A1 | 7/2004 | Mock et al. | |
| 2004/0136404 A1* | 7/2004 | Mahonen et al. | 370/503 |
| 2005/0125737 A1 | 6/2005 | Allen et al. | |
| 2005/0210104 A1 | 9/2005 | Torvinen | |
| 2005/0222971 A1 | 10/2005 | Cary | |
| 2006/0173917 A1 | 8/2006 | Kalmick et al. | |
| 2008/0288578 A1 | 11/2008 | Silfverberg | |
| 2009/0300221 A1 | 12/2009 | Gates et al. | |

FOREIGN PATENT DOCUMENTS

| | | |
|---|---|---|
| WO | WO 00/62146 A1 | 10/2000 |
| WO | WO 00/62201 A1 | 10/2000 |
| WO | WO 01/49051 A1 | 7/2001 |
| WO | WO 02/44958 A1 | 6/2002 |
| WO | WO 02/089026 A2 | 11/2002 |

OTHER PUBLICATIONS

Bisignano, Mario et al., "Expeerience: a Jxta middleware for mobile ad-hoc networks", Proceedings of the third International Conference on Peer-to-Peer Computing (P2P'03) 2003 IEEE, 2 pages.

D. Beard, M. Palanlappan, A. Humm, D. Banks, A. Nair, Y.Shan: "A Visual Calendar for Scheduling Group Meetings", Department of Computer Science, University of North Carolina, Chapel Hill, Oct. 1990 (pp. 279-290).

F.Dawson and D. Stenerson: "Internet Calendaring and Scheduling Core Object Specification (iCalendar)", Network Working Group, Request for Comments: 2445, Nov. 1998.

Paluska, Justin Mazzola et al., "Footloose: A Case for Physical Eventual Consistency and Selective Conflict Resolution", Proceedings of the Fifth IEEE Workshop on Mobile Computing Systems & Applications (WMCSA 2003) 2003 IEEE, 10 pages.

PCT International Preliminary Examination Report for PCT International Appln. No. US03/28053, mailed Mar. 3, 2005 (6 pages).

PCT International Preliminary Examination Report for PCT International Appln. No. US03/28247, mailed Feb. 25, 2005 (6 pages).

PCT International Preliminary Examination Report for PCT International Appln. No. US2005/014619, mailed Dec. 7, 2006 (7 pages).

PCT International Search Report for PCT International Appln. No. US03/28247, mailed Feb. 13, 2004 (6 pages).

PCT International Search Report and Written Opinion for PCT International Appln. No. US2005/014619, mailed Sep. 2, 2005 (11 pages).

PCT International Search Report for PCT International Appln. No. US03/28053, mailed Jun. 18, 2004 (5 pages).

PCT Written Opinion for PCT International Appln. No. US03/28053, mailed Sep. 16, 2004 (5 pages).

PCT Written Opinion for PCT International Appln. No. US03/28247, mailed Aug. 16, 2004 (5 pages).

Prasad, Sushil K. et al., "Implementation of a Calendar Application Based on SyD Coordination Links", Proceedings of the International Parallel and Distributed Processing Symposium (IPDPS'03) 2003 IEEE, 8 pages.

Prasad, Sushil K. et al., "Enforcing Interdependencies and Executing Transactions Atomically Over Autonomous Mobile Data Stores Using SyD Link Technology", Proceedings of the 23rd International Conference on Distributed Computing Systems Workshops (ICDCSW'03) 2003 IEEE, 7 pages.

Supplementary European Search Report for EP Application No. 03794665.4, dated Aug. 30, 2006 (3 pages).

Timecruiser Computer Corporation, "Timecruiser User Guide", Version 1.5, Jul. 1998, downloaded on Aug. 3, 2005 at https://www.atd.net/timecruiser/doc, pp. 1-50.

VAitA, OsaSync Frequently Asked Questions, Feb. 4, 2004, http://web.archive.org/web/20040204195815/http:www.vaita.com/faq.asp.

WindowsITPro, Replying To And Forwarding Messages, Jun. 6, 2003 http://web.archive.org/web/20030625191716/http://www.windowsitlibrary.com/Content/191/11/2.html.

De Herrera, Chris. "Microsoft ActiveSync 3.1," *Pocket PC FAQ* (2000), downloaded from the Internet at: http://www.pocketpcfaq.com/wce/activesync3.1.htm (pp. 1-9).

Lamport, Leslie "Time, Clocks, and the Ordering of Events in A Distributed System", *Communications of the ACM*, Jul. 1978, vol. 21, No. 7, pp. 558-565.

SyncML White Papers, "Building an Industry-Wide Mobile Data Synchronization Protocol", Version 1.0, date not later than Jun. 2000, 14 pages.

* cited by examiner

DATA SYNCHRONIZATION BETWEEN MULTIPLE DEVICES

The present invention relates to a method of synchronizing. In particular but not exclusively, the present invention relates to synchronizing data between devices such as computers, palm devices, personal digital assistants, music devices and mobile telephones. The data to be synchronized may comprise any data but commonly includes calendars, music files, photo files, emails, contact lists, bookmarks and any other such data. The present invention also encompasses synchronization of applications. The present invention envisages that such synchronization may occur between applications on the same device or on different devices.

Hereinafter references to data include data used by different applications and so the term "devices" includes applications stored on and run by an electronic device. Moreover, synchronization between devices includes synchronizing data used by different applications on the same electronic device.

Hitherto, synchronizing such devices with another device has required the additional acquisition of computer software, usually developed by the manufacturer of one of the devices. Such computer software is relatively clumsy and inefficient. Moreover, the computer software usually places limitations on the type or format of the data to be synchronized. Finally, each device will have its own corresponding synchronization software, each of which needs to be loaded on another device in order to effect synchronization.

Synchronization systems may be either server based whereby the synchronization system is stored and run on a server or central computer with the devices each synchronizing to that server or computer. Alternatively, synchronization can be achieved directly from one device to another and this is known in the art as "peer to peer" synchronization.

With any synchronization system, problems occur when there are three or more devices. Such problems include when one of those devices is absent. Thus, when the absent device is brought for synchronization, data for synchronization may be received by not only one other device but also all of the other devices in the system. This leads inherently to excessively redundant synchronization procedures and increases the likelihood of errors being introduced. One solution for obviating the problem is disclosed in one of our co-pending U.S. patent applications holding Ser. No. 10/453,051 filed on 2 Jun. 2003.

As well as the various different types of data to be synchronized, it is also possible to consider synchronizing not only each record but instead particular fields of a record. One advantage of synchronizing only the fields is that there is a smaller data exchange involved in the synchronization process. Another advantage is that two devices may change a different field in the same record without any conflict occurring. If synchronization was effected on a record basis, then in this situation a conflict would occur.

In addition, not only can the attributes be synchronized between devices but also the relationship between those attributes. For example, consider contact lists where a person's contact details are given and include home telephone number, work telephone number and mobile telephone number as well as various addresses including Email addresses of both work and home and postal address and work address. Each of the contact details would be considered a field whereas all of the contact details for a particular person would be considered the record. The contact lists may also include the relationships between that person and other persons held in the contact lists. This could include the fact that the first person is a brother to a second person. A third person's details may also be given together with the relationship that he is a father to both the first and second person. Any type of relationships may be given, not just relative relationships but also relationship information such as girlfriend, boyfriend or partner, work, colleague or other contact relationship.

One type of known synchronization system is shown in FIG. 1. In FIG. 1, there is a first device 2 to be synchronized with a second device 4. The devices 2 and 4 are due for synchronization through a synchronization engine 6. The synchronization engine uses conduits 8 and 10, a synchronizer 12 and a mingler 16. Each of the conduits has a device specific area 8a, 10a and a structured delta area 8b and 10b. Each of the conduits has a conduit store 14, only one of which is shown.

The synchronization system can be separated into three parts: the synchronization software which is stored on the devices, the synchronization engine which includes the synchronizer and mingler, and the conduits. The synchronization software provides the usual user interface for receiving and prompting for instructions from a user. The user interface enables synchronization to be initiated, provide a format for resolving conflicts, registering and configuring the devices to be included in the synchronization system and the synchronization log.

The synchronizer effects the synchronization of the data by processing the changes. Preferably, the data comprises a field but a whole record may be used if desired.

The conduits act a liaison between the synchronizer and the devices. The conduits principally translate the data between the devices data format and the synchronizer's canonical format. That is to say, the conduit receives data to be synchronized from the respective device and puts it into a canonical format and submits the same to the synchronizer. Conversely, the conduits receive canonical formatted data which is to be used to update the device and converts the same into the format of the respective device. In the example of contact lists, the device format may include fields such as first name, last name etc., whereas the canonical format for the synchronizer comprises fn for first name and ln for last name.

The conduit provides a static description of the device's capabilities and provides that to the synchronizer. The description does not change dynamically over time. Thus, it can provide the synchronizer with what type of records or fields the device can synchronize and the list of fields for each record type supported by the device.

The structured delta 8b, 10b of each conduit retrieves the record or field which has been modified in the device and compares it with that stored in the store 14. The structured delta effects that comparison and passes the change in the form known as a delta Δ. Thus, each of the conduits 8 and 10 provide a stream of deltas to the synchronizer.

In some devices, most typically mobile telephones, the devices are arranged to conserve memory as much as possible. Thus, many fields are truncated. Hence, there are seeming differences between that stored in the conduit store 14 and that stored on the device. An example of such a truncation would be to only allocate a certain number of letters in the person's name in a contact list. For example, the name Gardio Freedman (which is stored in the conduit store 14) is truncated by the device 4 to Gardio Freed. Thus, another function of the conduit is to include in the description of the device the type of truncation or translation of any data which may occur by the device. Thus, when receiving data from the device, the conduit should emulate the device and store the truncated data. That truncated data together with the description of the truncation or translation rules enables to conduit to prepare the full data for comparison to correctly identify true deltas Δs.

Thus, when synchronization is initiated, the conduit receives data to be synchronized from the respective device and translates any records which have been truncated. The structured delta then retrieves the stored record from the conduit store 14 and compares that with that received and translated from the device and prepares the change in the form of a delta Δ. The stream of deltas is of course presented in the canonical format prior to submission to the synchronizer. The synchronizer passes those streams of deltas to other devices. In return, the conduit also receives deltas from other devices, translates them from canonical format to the devices' format including any truncation to be applied and updates the device.

There are two types of synchronization, fast synchronization and slow synchronization. In fast synchronization, the conduit provides merely the changes in fields or records since the last synchronization. Those changes may include any fields or records which have been added, modified or deleted. This is the default-type of synchronization and the one that is preferred since it involves less data transfer and is significantly quicker. However, not all devices can support this type of synchronization. The second type of synchronization is referred to as slow synchronization. In slow synchronization, the conduit is unable to identify which fields or records have been changed since the last synchronization. Accordingly, all data in the device is passed for synchronization. The synchronization engine must identify those changes by comparing each and every record with that stored in the conduit store 14. Needless to say, slow synchronization is relatively slow and inefficient in comparison to fast synchronization.

As noted previously, any changes to the records or the fields may involve a deletion, addition or modification. FIG. 2 is representative of two devices, device 1 and device 2, submitting such changes. In this case, D indicates a deleted recorded, M indicates a modified record and A indicates a record to be added. The tables include the record ID to be deleted, modified or added. Thus, device 1 in the example shown in FIG. 2 deletes record 7, modifies record 5 and adds record 1, and these changes are submitted to the synchronization engine 6. A second device submits other changes to the synchronization engine 6 including modification of record 9, modification of record 3 and adding record 2. These changes are submitted either during a fast synchronization procedure or a slow synchronization procedure. In either case, the synchronization engine needs to apply the corresponding changes submitted by device 2 to device 1. Thus, the synchronization engine 6 supplies to device 1 the changes submitted by device 2. Namely, modification of record 9, modification of record 3 and addition of record 2. Corresponding changes are passed to device 2, which have been submitted by device 1. Each device through its conduit 8, 10 goes through all records supported by the device through the record IDs from the first record ID to the last.

Several problems occur with this existing arrangement for synchronization. The first such problem is when a device is absent or application not available from the synchronization event. In this case, any unavailable devices are assumed to be present and a virtual output is generated by the synchronizer. This virtual output is stored in a virtual store 18 in the synchronization engine. When the absent device is available to the synchronization system, the virtual output stored in the virtual store 18 is used as input to the synchronization engine 6 to update the absent device, device 3. This leads to a further second problem in that if both device 1 and device 2 both effect the same change to the same field or record, then potentially redundant synchronization steps are required when updating absent device 3.

In all of the above, should any change submitted by more than one of the device be in conflict with each other, then those changes are submitted for conflict resolution through the user interface.

One known solution for ameliorating the problem of an absent device and then subsequent redundant synchronization steps is to effect likelihood matching between records instead of comparing all of the records in the device to be updated. However, this is relatively inefficient and does not obviate all of the potentially redundant synchronization steps.

A third problem associated with prior synchronization systems is as a consequence of the truncation of data by the devices. In the former example, such truncation includes restricting the number of letters in a person's name in a contact list, i.e. the name Gardio Freedman is stored as Gardio Freed. Hitherto, this problem has been overcome by first comparing the fields between the device and its respective conduit store and if there is a match between the two fields, then any truncation of data is to be ignored. If the two fields are not comparable, then the devices specific areas 8*a* and 10*a* get the full record from the device and compare that with that stored in the conduit store.

However, this apparent solution further compounds the problem of when one of the devices is absent, since when the absent device is brought for synchronization the problem of device truncation is repeated. Moreover, this solution is very data intensive and hence very time consuming.

A further fourth problem associated with existing synchronization systems is that synchronization of relationship data is very limited. This is as a consequence of the limitations imposed by the conduits.

A further fifth problem associated with existing synchronization systems results from the fact that the synchronization software and conduits all reside within the synchronization engine 6. Hence, if there is any problem with the synchronization software, then no devices can be synchronized. Moreover, when two or more devices are connected to the synchronization engine and undergoing synchronization, the devices are synchronized simultaneously and hence the same data may be accessed at the same time leading to greater conflicts and greater error generation.

Accordingly, the present invention is directed to providing an improved method of synchronizing which overcomes or ameliorates each of the problems enumerated above. That said, the present invention comprises a method of synchronizing data between a primary device and one or more subsidiary devices, said method comprising:

storing a primary set of data on said primary device;

comparing data on each subsidiary device with said primary set of data;

updating said primary set of data; and updating data on each of said subsidiary devices using said updated primary set of data.

Embodiments of the present invention will now be described by way of further example only and with reference to the accompanying drawings, in which.

In the figures, similar reference numerals are used to refer to like features.

The present invention differs from the prior art by separating the conduits 8 and 10 from the synchronization engine 6. Moreover, synchronization software is provided for each device conduit rather than having a single synchronization software for operating the synchronization engine 6. In this manner, the present invention overcomes the fifth problem discussed above, namely the synchronization engine having synchronization software which is applicable to all devices. Accordingly, each conduit is able to function independently of any other conduit. Some devices may not be able to support separate synchronization software and have its own conduit such as that shown as device 2. None the less, the synchronization method accordingly to the present invention enables such devices to be accommodated.

The present invention also differs from the prior art in that the synchronization engine 6 now includes a truth table 20. The truth table is an amalgamated copy of the records from all of the devices involved in the synchronization system. Thus, during synchronization, each device is synchronized serially one at the time with the truth table and each record of the device is synchronized with each record in the truth table. Having obtained an amalgamation of all of the updated records from all of the devices, only then are the devices synchronized with the truth table. The devices, according to the synchronization system of the present invention, are never directly synchronized with each other but only with the truth table.

Since the devices are each synchronized with the truth table, this simplifies the first problem enumerated above, when devices are absent. Moreover, the present invention also obviates the second problem by avoiding redundant synchronization steps since the same change being submitted by two devices is only applied once to update the truth table. The system in the present invention also obviates the fifth problem, in that since the devices are each updated in turn, the truth table is not accessed simultaneously and so conflicts are avoided by the devices being synchronized simultaneously.

The truth table is defined not by the number of changes but rather by the number of records held on all the devices. Accordingly, the truth table is defined by the total number of records. This is in contrast to the prior art which effects synchronization by storing the total number of changes. The truth table can provide data for updating devices depending upon the requirements of the devices. In some cases the devices merely want the deltas whereas some devices require the whole record.

Figure 1:
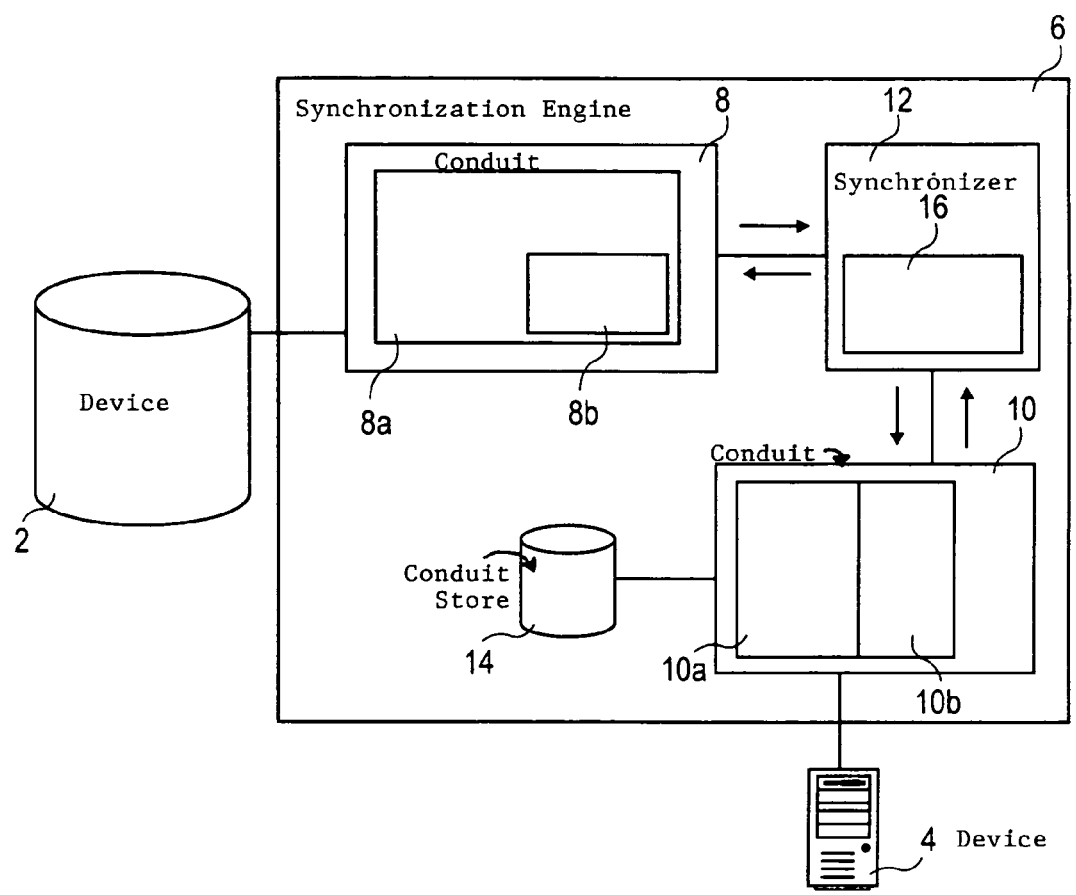
FIG. 1 is a schematic overview of a synchronization system according to the prior art.
Figure 2:
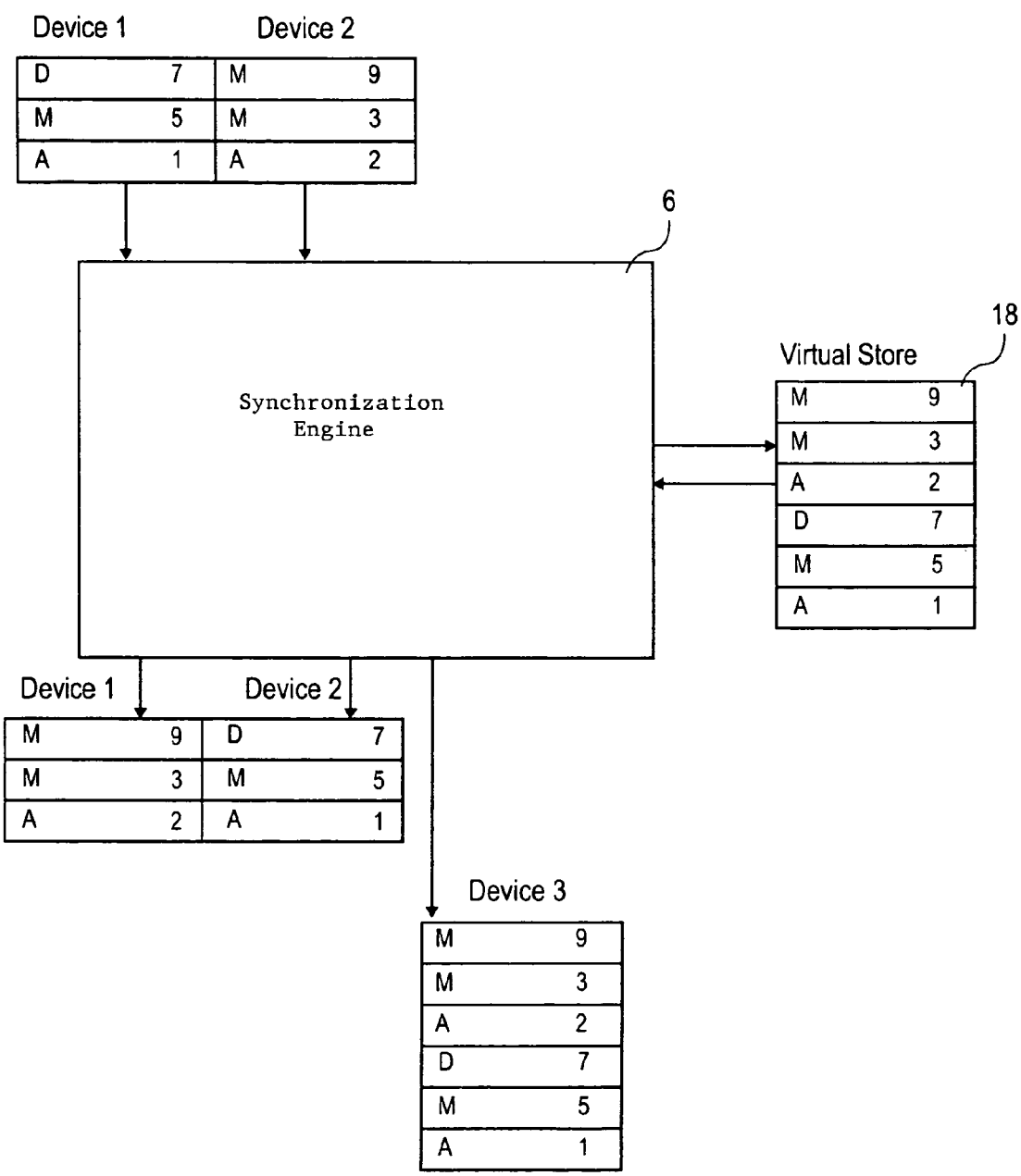
FIG. 2 is a diagram illustrating changes effected on three devices being synchronized according to the prior art.
Figure 3:
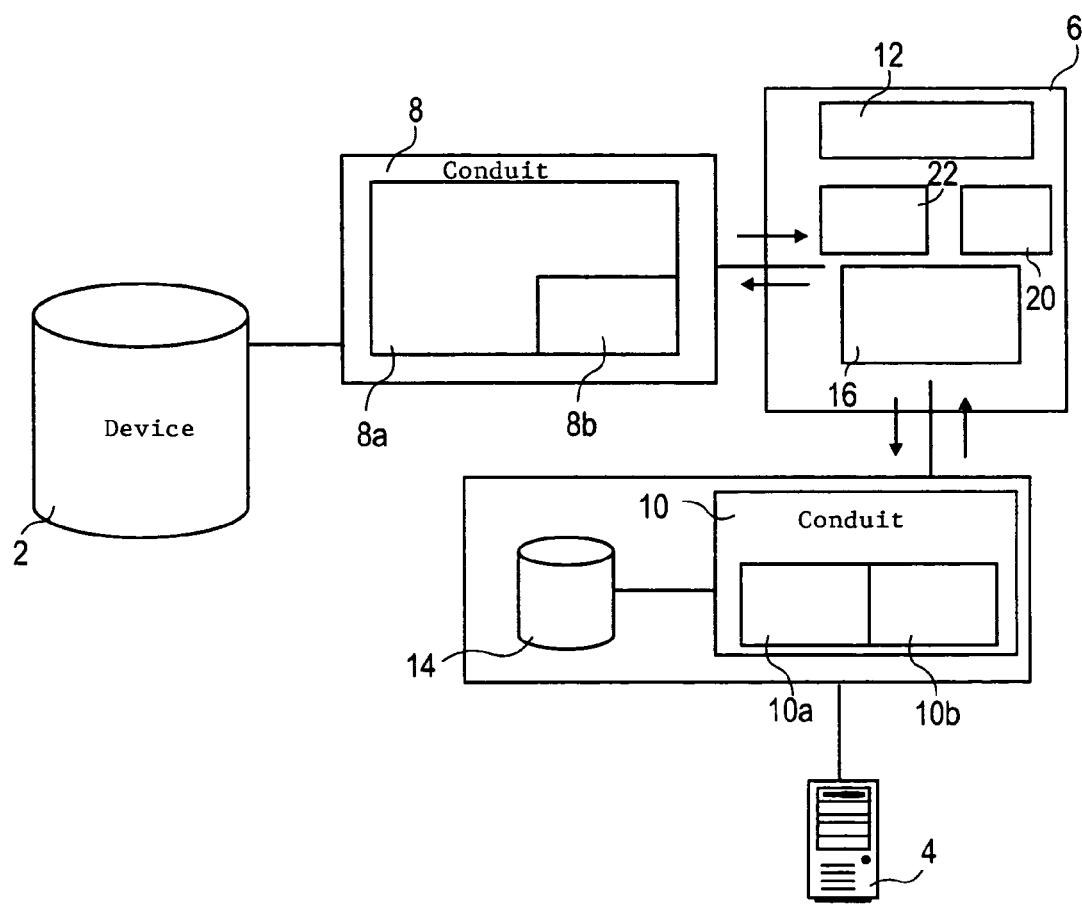
FIG. 3 is a schematic diagram of a synchronization system according to the present invention.
Figure 4:
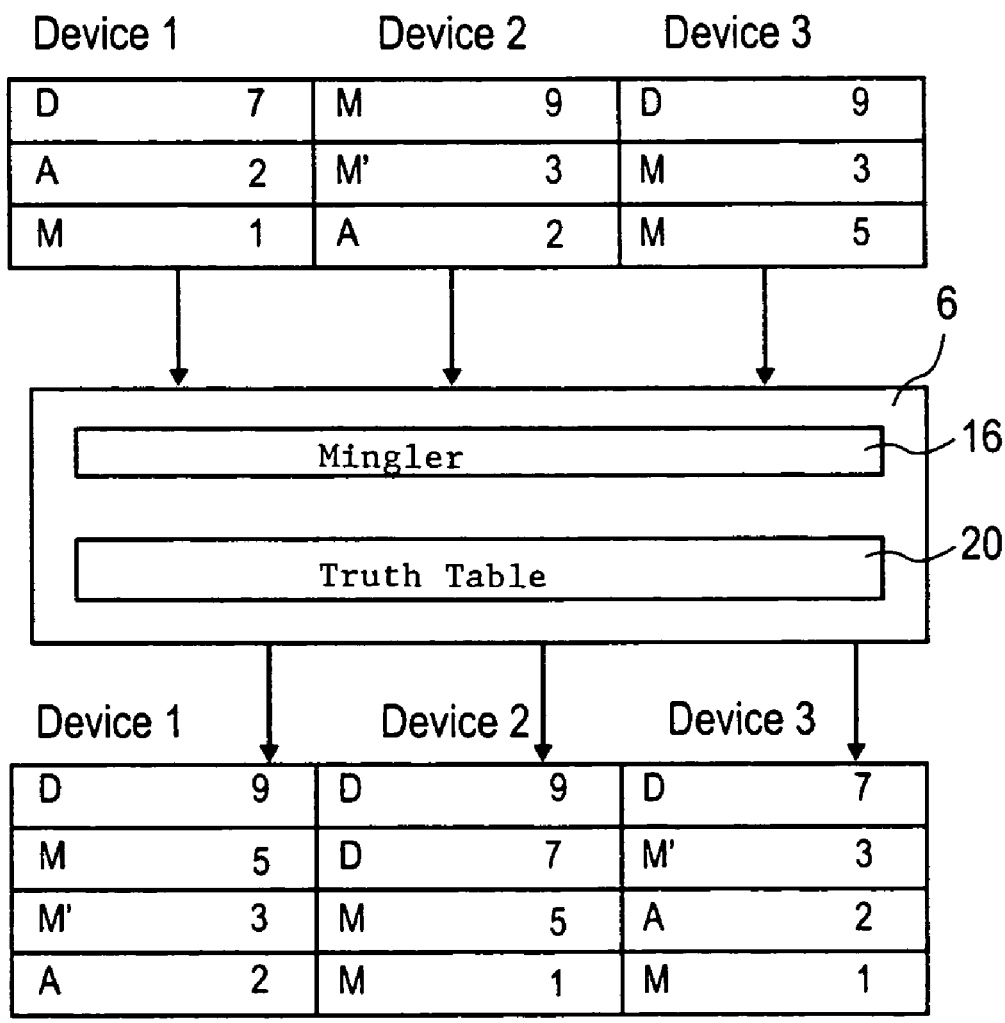
FIG. 4 is a figure illustrating changes effected by three devices being synchronized according to the present invention.

As in the prior art, the present invention enables conflicts to be resolved. In the example given in FIG. 4 (which omits features not of relevance for this part of the description), device 1 submits a deletion of record number 7, an add of record number 2 and a modify of record number 1. This is applied to the truth table 20 by a mingler 16 in the synchronization engine 6. Device number 2 submits a modified to record number 9, a modified to record number 3 and an add to record number 2. This is also applied to truth table 20. Device number 3 then submits changes which involve delete of record number 9, a different modify to record number 3 and a modify of record number 5. The mingler 16 calls for conflict resolution, those conflicts involving record number 9 and record number 3, and the result of that conflict resolution is stored in truth table 20. The truth table then contains an aggregate of all of the changes involved on the three devices.

Each of the devices are then in turn updated so as to be synchronized with the truth tabled 20 but omitting the changes which are submitted by that device. Hence, device number 1 does not require the data involving the deletion of record number 7, the addition of record number 2 and modification of record number 1. Instead, the conduit for device number 1 extracts from the truth table 20 the changes to be updated, namely the deletion of record number 9, the modification of record number 5; the alternative modification of record number 3 and the addition of record number 2. Similar updates are also obtained and effected by the respective conduits for devices 2 and 3.

As discussed previously, some data to be synchronized involves not only attribute data but also relationship data. It is known to model data using a form of the entity relationship model (ERM). This enables the data to be categorized into records and relationships between the records. The data is categorized by a schema 22. The present invention includes a schema 22 in the synchronization engine 6. Since the schema categorizes the data into records and relationships, it is able to define and vary the definitions of the data categorization. Hence, the schema together with the details of the device capabilities provided by the device specific areas 8a and 10a, the synchronization engine can accommodate for truncation or translation of the data by any one of the devices. For example, consider the following data held by two devices:

| Field Name | Device 1 | Device 2 |
|---|---|---|
| First | Steve | Steve |
| Middle | G | |
| Last | Smith | Smith |

In this example, Device 2 does not retain the middle field. Hence, the schema identifies certain fields as an identity key. If, the schema identifies the first and last name as identity keys, then the records held by device number 1 and device 2 will be considered to be same. The use of a schema in the synchronization engine is particularly useful in overcoming the third problem enumerated above.

Another such example is when a contact list includes all details of a particular person, as discussed above. However, on a device such as a mobile phone, only the home, work and mobile telephone numbers are required and not any of the addresses. Thus, the schema would define the data from such a mobile telephone as only comprising those telephone number fields.

It is to be noted that, in contrast to the prior art, although the synchronization method may be effected through the user interface, the present invention more preferably is initiated by the device or application itself depending upon the criteria set for that device or application.

The synchronization method according to the present invention involves four phases. These phases include negotiation, application, mingling and updating, and these are discussed in more as follows:

Negotiation

In the first instance, each conduit must negotiate the synchronization mode. As noted above, there are two types of synchronization. Normally, the synchronization mode selected is that of fast synchronization. However, some devices may not be able to support a fast synchronization, or indeed the conduit may not be able to select the relevant records for fast synchronization and so elect to proceed with slow synchronization. The synchronization engine then confirms which synchronization mode is to be effected and, accordingly, the conduit interrogates the device according to the appropriate mode of synchronization.

Application

Once the synchronization mode has been negotiated, the conduit extracts the changes from the device when undergoing fast synchronization. When the synchronization mode involves slow synchronization, all data to be synchronized is extracted by the conduit and passed to the synchronization engine 6.

Mingling

The mingler receives the changes from all of the conduits and applies those changes first in turn from each device and then through each record. Any conflicts between changes are identified. The changes are then applied to the truth table.

If there is a conflict with any record, the synchronization engine first tries to resolve the conflict using a set of rules specific to the record in question. If a conduit has added customised field to a record type, then the conduit specific to that device may attempt to resolve the conflict. Only if the conflict cannot be resolved using such rules, will the synchronization engine then request resolution from the user.

The step of mingling also involves optimizing a set of consecutive changes to a record by discarding all but the final change. For example, if one device changes a field in a record from value A to B and then on a subsequent synchronization from value B to C, then the mingler optimizes the changes by applying only the change from A to C. This change from A to C is then applied to update any devices required.

Updating

The final step in the synchronization process is for each conduit to receive from the synchronizer the changes stored in the truth table and prepare those for updating the respective device. If the device requires any truncation or translation of the data, then the conduit stores that truncation rule in the store. Having effected the updating of the device with all of the changes, then the conduit confirms that the updating has been completed to the synchronization engine.

As noted above, it can be a problem when devices truncate or translate data stored on that device. In addition to providing full flexibility for the schema in the synchronization engine, the synchronization method also differs from the prior art by providing a more efficient solution to this problem of truncation or translation of data. The synchronization method thus enables the conduit to compare fields between the device and the conduit store to identify whether there are any changes. If the two fields match, then no change has been effected and the conduit need not advise the synchronization engine in relation to that field. However, the fields may differ between that stored in the store and that stored in the device. As in the prior art, the conduit through the device specific areas 8a and 10a seek to extract the full record from the device and the store together with any truncation or translation rules which may be applied. The conduit then compares the two full records taking into account any truncation or translation rules. The present invention differs from the prior art in that the conduit also considers what each record or field might look like:

a) from the device;

b) to the device; and c) and when actually compared with each other this is known as the triple comparison test and enables fields or records to be compared to the device, from the device and the actual field or record. This significantly reduces the number of conflicts that are passed for conflict resolution.

The method of synchronizing according to the present invention also includes a solution to the problem of poor synchronization of relationships. This is achieved through providing the schema to be able to define more flexibly the data categorizations and in addition whether fields are connected or dependent upon each other and the type of dependency.

The schema also acknowledges and tries to preserve the order of changes. There are various modes of ordering and these are as follows:

the fact that there is no order;

weakly ordered: which implies the orders specified are preferable but not necessary and so if any conflict arises, then the synchronization should attempt to resolve the conflict without seeking conflict resolution;

strongly ordered: where the order is considered necessary and so if there is any conflict, then the matter should always be passed for conflict resolution.

Through the use of acknowledging and preserving the orders, this enables the synchronization of relationships to be preserved.

An example of such ordering is as follows:

| Truth table | | Conduit store | | Device |
|---|---|---|---|---|
| A B C | → | A $\underline{B}$ C | → | A C |
| A" B C | ← | A $\underline{B}$ C | ← | A" C |
| A" B C D | → | A" $\underline{B}$ C D | → | A" C D |

In this example, the truth table contains records or fields A B and C. These are also stored in the conduit store but with B noted as being not supported by it's respective device. Thus the device only stores A and C. A change is made to A by the device and this is compared by the conduit with that stored in the conduit store. The comparison does not involve B since the conduit store confirms that B is not supported by the device. The change is passed into the truth table. In this case, the absence of B in the device is only indicated as weakly ordered and so it is not passed for conflict resolution. Subsequently, the truth table is updated from another device by the addition of D. This is passed through the conduit to update the store and the device. Again, no conflict is raised due to the weak ordering.

Thus, when synchronizing such a device, the following information would be present in the truth table, conduit store and device.

As noted above, the present invention is particularly directed to overcoming five problems and these include accommodating for absent devices or applications, avoiding redundant synchronization steps, accommodating for truncation or translation of data by devices or applications, enabling and preserving synchronization of relationships and obviating known synchronizing methods wherein two devices or applications are accessing the same database thereby causing inherent conflict. The present invention provides the solution for each of those problems as discussed above. In addition, the synchronization method effects what is known in the art as trickle synchronization. This enables each device to effect synchronization frequently. Hence, only a small amount of data at any one time is held in the truth table. This results in faster synchronization and involves less conflict. Whenever conflicts do arise, the user through the user interface may resolve those conflicts at that time or elect to resolve them at a later date.

In order to effect trickle synchronization more efficiently, the user also defines the mode of synchronization for each of the devices involved in the system. Typically, if the device involves a computer application, then fast synchronization is elected. If the devices involve connection to a PC through Wire, Fire Wire or Blue Tooth, then it is usual to elect slow synchronization since almost certainly all data will need to be submitted for such synchronization. Where the device comprises a server, it involves low latency but high connectivity and therefore it is usual to elect slow synchronization. Thus, each of the types of devices may elect the type of synchronization and, moreover, may elect when such synchronization is effected. For example, if the device is a mobile phone, whenever the phone is in range, then the synchronization process may be affected. Alternatively, if the device comprises a computer program for managing calendars, then whenever the program is initiated, then it is usual to instruct synchronization to be effected first.

Figure 5:
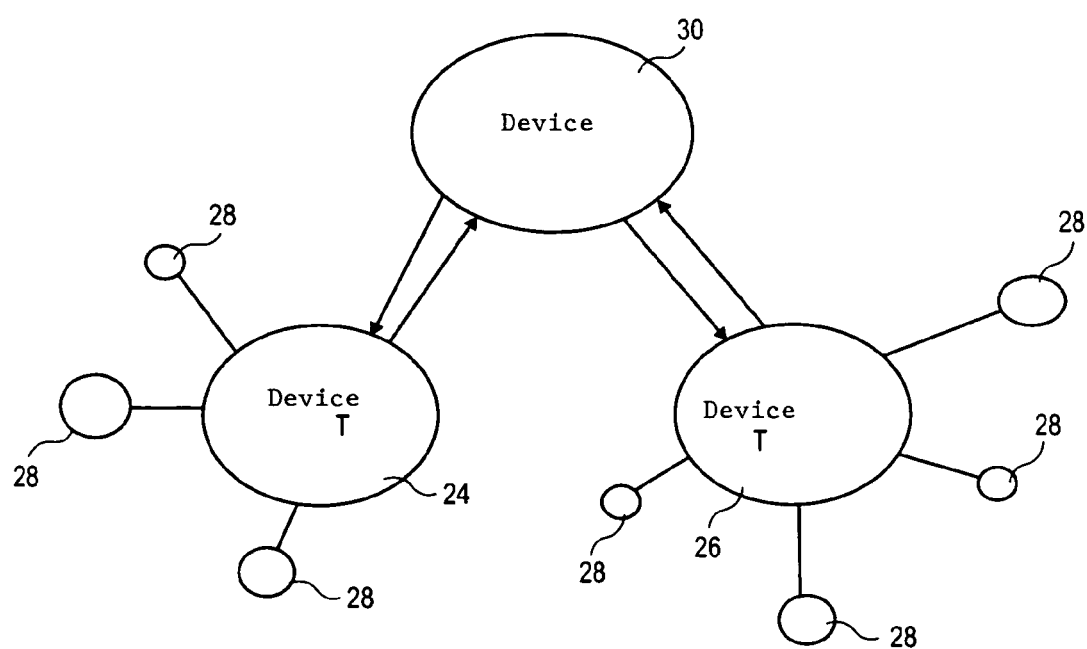
FIG. 5 illustrates a schematic diagram of a system overview of synchronization according to the present invention.

By allowing the synchronization method of the present invention to effect trickle synchronization, each of the devices or applications is synchronized optimally. The present invention relies upon the use of a truth table. However, that truth table may be stored on not just one device but on more than one device. FIG. 5 illustrates two principal devices, 24 and 26, each of which contains a truth table. Each device 24 and 26 has a number of satellite devices 28 with whom synchronization is effected through a respective conduit and synchronization engine. When the two devices 24 and 26 are connected either directly or through an intermediary device 30, such as a server, then there may be different truths in the truth tables stored on devices 24 and 26. No one truth table has precedent. However, when the two devices 24 and 26 are synchronized, then the changes from one are passed to another and visa-versa. If any conflict occurs, then the synchronization method assumes that the one initiating the synchronization is assumed to be the master and its changes in any conflict are passed and implemented in the truth table on the other device.

The aforegoing description has been given by way of example only and it will be appreciated by a person skilled in the art that modifications can be made without departing from the scope of the present invention.

The invention claimed is:

1. A method, comprising:
storing subsidiary device data on a synchronization device, wherein the subsidiary device data includes one or more truncation rules corresponding to one or more truncated records, a variable schema categorizing the subsidiary device data by relationships, and a static description of one or more device capabilities, and wherein the subsidiary device data is stored in a truth table that includes a copy of records associated with a plurality of subsidiary devices;
negotiating, using one or more processors, a synchronization mode for each subsidiary device using an associated device conduit that includes synchronization software, such that:
when a device conduit is able to identify record deltas since a last synchronization of a subsidiary device, a fast synchronization mode is negotiated for the subsidiary device, wherein during a fast synchronization, the device conduit transmits only the record deltas from the subsidiary device to the synchronization device, and
when a device conduit is unable to identify record deltas since a last synchronization of a subsidiary device, a slow synchronization mode is negotiated for the subsidiary device, wherein during a slow synchronization, the device conduit transmits all records from the subsidiary device to the synchronization device, and wherein the synchronization device identifies record deltas by comparing each transmitted record to a record stored in the truth table;
serially and individually synchronizing each record delta from each subsidiary device with a corresponding record stored in the truth table, wherein synchronizing includes optimizing a set of record deltas associated with a subsidiary device by discarding all but the last record delta received; and
transmitting the last record delta from the synchronization device to each device conduit, wherein each device conduit uses the schema, the static description, and the one or more translation rules to translate any truncated records, and wherein each device conduit uses the last record delta to update an associated subsidiary device.

2. The method of claim 1, wherein the static description of one or more device capabilities includes a list of one or more fields for each record type supported by the subsidiary device, and wherein a record delta includes changes to one or more fields of a record since a last synchronization of a subsidiary device.

3. The method of claim 1, further comprising:
resolving conflicts between each record delta and the subsidiary device data stored in the truth table using one or more rules.

4. The method of claim 1, wherein the subsidiary device data further includes one or more truncated records, and wherein the one or more truncation rules correspond to the one or more truncated records.

5. The method of claim 1, wherein the relationship data correspond to relationships between the one or more records associated with a subsidiary device.

6. The method of claim 5, wherein the static description of one or more device capabilities includes the type of records the device can synchronize, and a list of one or more fields for each record type supported by the subsidiary device.

7. The method of claim 6, wherein the subsidiary device data includes one or more truncated records.

8. A system, comprising:
one or more processors;
one or more computer-readable storage mediums containing instructions configured to cause the one or more processors to perform operations including:
storing subsidiary device data on a synchronization device, wherein the subsidiary device data includes one or more truncation rules corresponding to one or more truncated records, a variable schema categorizing the subsidiary device data by relationships, and a static description of one or more device capabilities, and wherein the subsidiary device data is stored in a truth table that includes a copy of records associated with a plurality of subsidiary devices;
negotiating a synchronization mode for each subsidiary device using an associated device conduit that includes synchronization software, such that:
when a device conduit is able to identify record deltas since a last synchronization of a subsidiary device, a fast synchronization mode is negotiated for the subsidiary device, wherein during a fast synchronization, the device conduit transmits only the record deltas from the subsidiary device to the synchronization device, and
when a device conduit is unable to identify record deltas since a last synchronization of a subsidiary device, a slow synchronization mode is negotiated for the subsidiary device, wherein during a slow synchronization, the device conduit transmits all records from the subsidiary device to the synchronization device, and wherein the synchronization device identifies record deltas by comparing each transmitted record to a record stored in the truth table;

serially and individually synchronizing each record delta from each subsidiary device with a corresponding record stored in the truth table, wherein synchronizing includes optimizing a set of record deltas associated with a subsidiary device by discarding all but the last record delta received; and transmitting the last record delta from the synchronization device to each device conduit, wherein each device conduit uses the schema, the static description, and the one or more translation rules to translate any truncated records, and wherein each device conduit uses the last record delta to update an associated subsidiary device.

9. The system of claim 8, wherein the static description of one or more device capabilities includes a list of one or more fields for each record type supported by the subsidiary device, and wherein a record delta includes changes to one or more fields of a record since a last synchronization of a subsidiary device.

10. The system of claim 8, further comprising instructions configured to cause the one or more processors to perform operations including:

resolving conflicts between each record delta and the subsidiary device data stored in the truth table using one or more rules.

11. The system of claim 8, wherein the subsidiary device data further includes one or more truncated records, and wherein the one or more truncation rules correspond to the one or more truncated records.

12. The system of claim 8, wherein the relationship data corresponds to relationships between the one or more records associated with a subsidiary device.

13. The system of claim 12, wherein the static description of one or more device capabilities includes the type of records the device can synchronize, and a list of one or more fields for each record type supported by the subsidiary device.

14. The system of claim 13, wherein the subsidiary device data includes one or more truncated records.

15. A computer-program product, tangibly embodied in a machine-readable storage medium, including instructions operable to cause a data processing apparatus to:

store subsidiary device data on a synchronization device, wherein the subsidiary device data includes one or more truncation rules corresponding to one or more truncated records, a variable schema categorizing the subsidiary device data by relationships, and a static description of one or more device capabilities, and wherein the subsidiary device data is stored in a truth table that includes a copy of records associated with a plurality of subsidiary devices;

negotiate a synchronization mode for each subsidiary device using an associated device conduit that includes synchronization software, such that:

when a device conduit is able to identify record deltas since a last synchronization of a subsidiary device, a fast synchronization mode is negotiated for the subsidiary device, wherein during a fast synchronization, the device conduit transmits only the record deltas from the subsidiary device to the synchronization device, and when a device conduit is unable to identify record deltas since a last synchronization of a subsidiary device, a slow synchronization mode is negotiated for the subsidiary device, wherein during a slow synchronization, the device conduit transmits all records from the subsidiary device to the synchronization device, and wherein the synchronization device identifies record deltas by comparing each transmitted record to a record stored in the truth table;

serially and individually synchronize each record delta from each subsidiary device with a corresponding record stored in the truth table, wherein synchronizing includes optimizing a set of record deltas associated with a subsidiary device by discarding all but the last record delta received; and transmit the last record delta from the synchronization device to each device conduit, wherein each device conduit uses the schema, the static description, and the one or more translation rules to translate any truncated records, and wherein each device conduit uses the last record delta to update an associated subsidiary device.

16. The computer-program product of claim 15, wherein the static description of one or more device capabilities includes a list of one or more fields for each record type supported by the subsidiary device, and wherein a record delta includes changes to one or more fields of a record since a last synchronization of a subsidiary device.

17. The computer-program product of claim 15, further comprising instructions operable to cause a data processing apparatus to:

resolve conflicts between each record delta and the subsidiary device data stored in the truth table using one or more rules.

18. The computer-program product of claim 15, wherein the subsidiary device data further includes one or more truncated records, and wherein the one or more truncation rules correspond to the one or more truncated records.

19. The computer-program product of claim 15, wherein the relationship data corresponding to relationships between the one or more records associated with a subsidiary device.

20. The computer-program product of claim 19, wherein the static description of one or more device capabilities includes the type of records the device can synchronize, and a list of one or more fields for each record type supported by the subsidiary device.

21. The computer-program product of claim 20, wherein the subsidiary device data includes one or more truncated records.

* * * * *

UNITED STATES PATENT AND TRADEMARK OFFICE
CERTIFICATE OF CORRECTION

| | | |
|---|---|---|
| PATENT NO. | : 7,809,682 B2 | |
| APPLICATION NO. | : 10/852926 | |
| DATED | : October 5, 2010 | |
| INVENTOR(S) | : Toby Paterson et al. | |

It is certified that error appears in the above-identified patent and that said Letters Patent is hereby corrected as shown below:

In column 12, line 47, in claim 19, delete "corresponding" and insert -- corresponds --, therefor.

Signed and Sealed this
Fifteenth Day of November, 2011

David J. Kappos
*Director of the United States Patent and Trademark Office*